United States Patent [19]

Easley, Jr. et al.

[11] 4,343,586

[45] Aug. 10, 1982

[54] DUMPING APPARATUS AND METHOD

[75] Inventors: Othel D. Easley, Jr., Houston; Merlin G. Hoiseth, Alvin, both of Tex.

[73] Assignee: Reactor Services International, Inc., Alvin, Tex.

[21] Appl. No.: 190,347

[22] Filed: Sep. 24, 1980

[51] Int. Cl.³ .............................................. B65G 65/34
[52] U.S. Cl. .................................... 414/414; 414/415; 414/420; 414/786
[58] Field of Search .............................. 414/364–366, 414/415, 414, 420–424, 786

[56] References Cited

U.S. PATENT DOCUMENTS

| | | | |
|---|---|---|---|
| 2,851,178 | 9/1958 | Rea et al. | 414/420 |
| 2,942,716 | 6/1960 | Stone | 414/422 X |

Primary Examiner—Robert G. Sheridan

[57] ABSTRACT

An improved container dumping apparatus is a press adapted to hold at least one container with or without a pallet and a frame for supporting and surrounding the press where the press comprises a top hopper closure with a valve means on top, pulleys on each side, means for supporting the hopper closure on the frame, and means for pivoting the press, and a bottom support closure with a pulley on each side, and a means for attaching a cable, the frame comprises a rectangular prism with the front lateral portion missing so as to allow the press to pass through the front, having means for supporting the hopper closure and means for interacting with the press to cause the press to invert upon lifting off the frame and to right itself upon lowering onto the frame. A method of emptying a container comprises: placing at least one container on a support closure within a frame where the support closure is beneath a hopper closure supported on the same frame, the two closures forming a press; lifting the support closure by means of a lifting device, such as a crane, where the lifting devise is connected to the press by a cable which passes from the lifting devise down over pulleys on the sides of the support closure, up over pulleys on the sides of the hopper closure to a means for attaching the cable on the support closure, so that the top of the container is forced into the hopper closure; lifting further to cause the press to invert through a series of interactions with the frame; positioning the inverted press over the dumping site and emptying the hopper closure; positioning the press over the frame and lowering so that the press is caused to right itself through a series of interactions with the frame, the empty container coming free from the hopper closure and the support closure with the empty container returning to its original surface.

20 Claims, 8 Drawing Figures

DUMPING APPARATUS AND METHOD

BACKGROUND OF INVENTION

In many industrial situations manufacturers use materials in their production operations which they obtain in large shipping containers such as boxes, drums or barrels. In some cases the shipping containers are delivered one or more on a pallet to facilitate handling and storage. The materials in the shipping containers may be in fluid form, i.e., liquids or free flowing solids such as granules or powders.

The manufacturer is faced with the problem of transferring the contents of the shipping containers into another container such as a bin or reactor. This is especially a problem in the petroleum refining and chemical industries.

The transfer of the contents of one container into another container may be done pneumatically by pumping (sometimes with air or another fluid) the contents out of one container into a second container or it may be done by dumping the contents from the first container into the second container. The dumping requires opening the top of the first container, lifting the first container over the entrance to the second container and tipping the first container to force the contents from the first container into the second container. The shipping containers are often heavy and require mechanized lifting devices capable of lifting, positioning and tipping containers, then returning the empty shipping containers to their original positions.

The present invention is an improved container dumping apparatus and method of emptying the contents of a container or of a pallet of containers into another container.

SUMMARY OF THE INVENTION

It is the object of the present invention to provide an improved container dumping or emptying apparatus and method of using same for transferring the contents of one container or set of containers into another container.

It is an object of the invention to provide a container dumping apparatus and method of using same where the device comprises a container press capable of accepting and enclosing one or more containers, with or without a pallet. It is a further object of the invention to provide a container dumping apparatus where when the containers press is lifted, it turns upside down because of the position of the center of gravity of the press and container combination and where the top of the press is equipped with a delivery door or valve.

It is an object of the present invention to provide for a container dumping apparatus and method of using same where there is a press rack or frame capable of forcing a press/container right side up and capable of supporting the righted press with and without the container or containers.

Other objects of the invention will become apparent from the detailed description of the invention.

DESCRIPTION OF THE PREFERRED EMBODIMENTS

Figure 1:
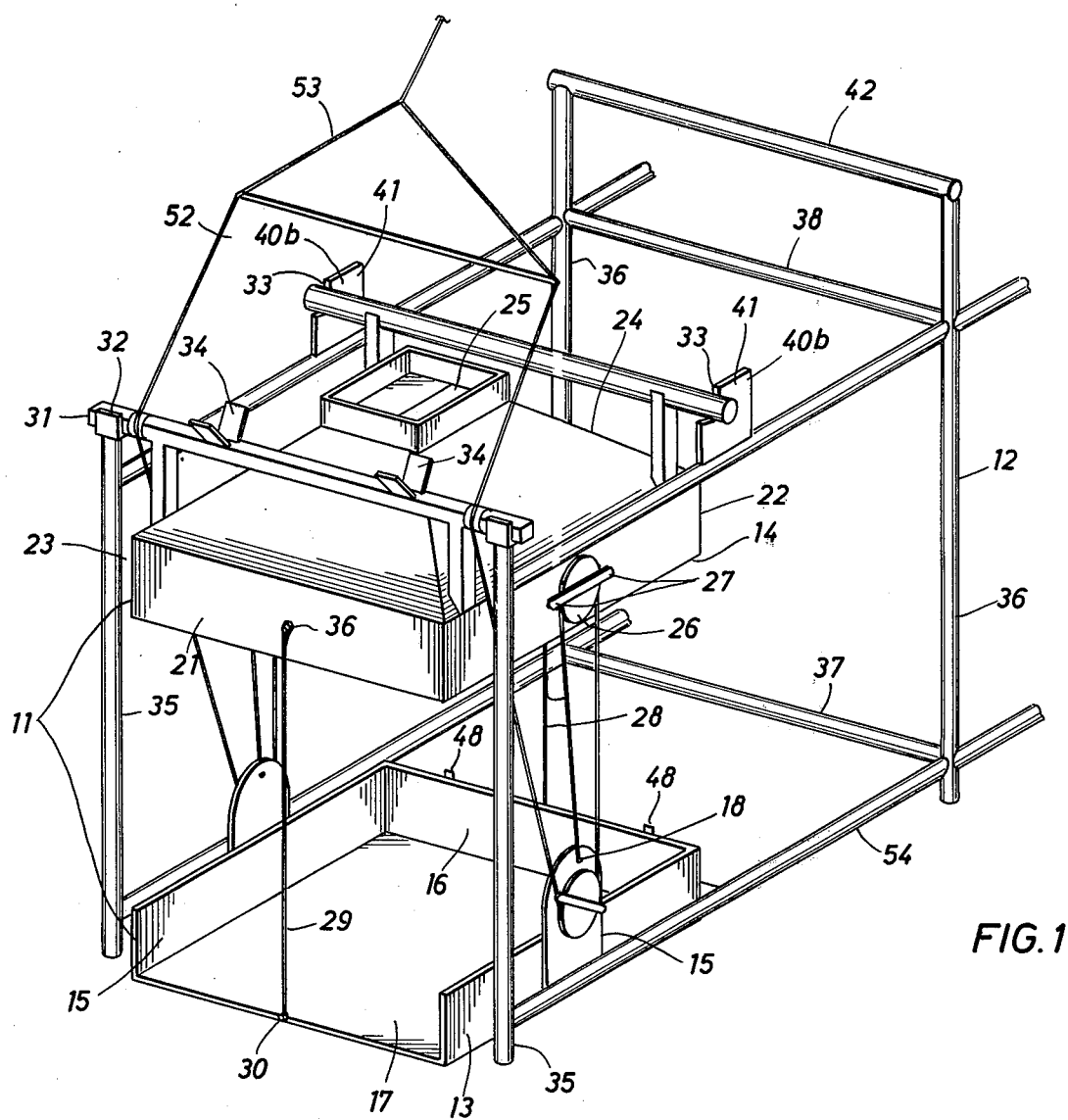
FIG. 1 is a front view of the invention.
Figure 3:
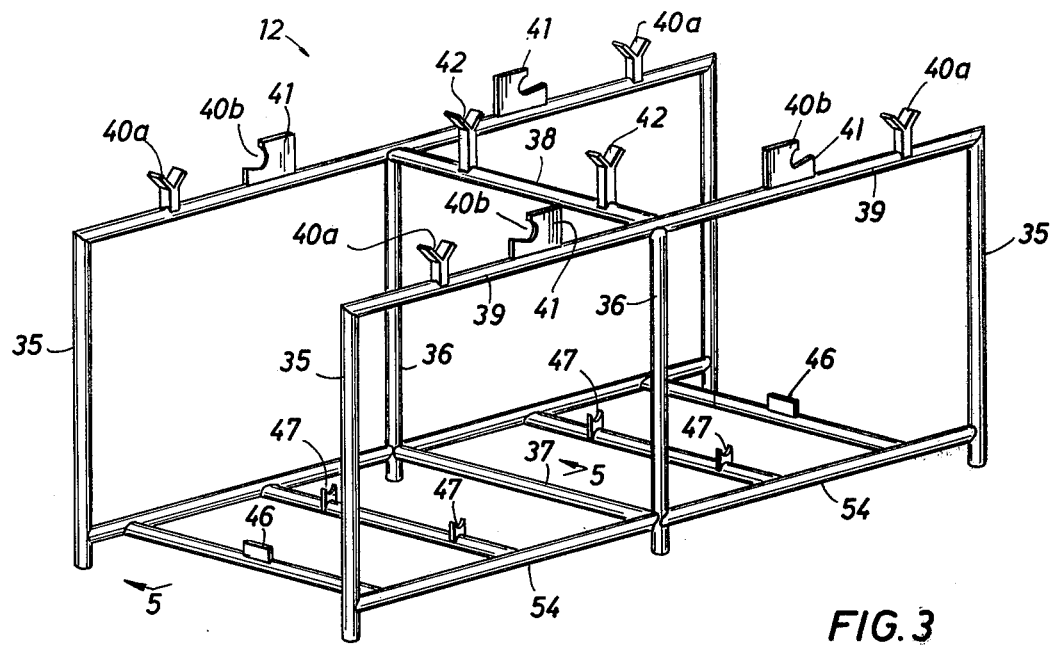
FIG. 3 is a view of the frame means.

Referring to FIG. 1, the invention or improved container dumping apparatus comprises a container press 11 (shown alone in FIG. 4) and a support rack or frame 12 (shown alone in FIG. 3).

The container press 11 comprises a container bottom support closure or tray 13 and a container top hopper closure 14.

In the embodiment of the invention shown in FIG. 1, the container bottom support closure or tray 13 adapted to hold the container has two sides 15, a back 16 and a floor or bottom 17 (no front). Each side 15 is equipped with a line or cable attachment means 18 and a bottom pulley 19 positioned below the attachment means 18. In a preferred embodiment, the bottom pulley 19 has a line or cable bottom guide means or channel stop means 20 near that part of the circumference of the bottom pulley 19 closest to the back 16. This bottom guide means 20 serves to hold the cable on the bottom pulley 19 and retard rotation during operation of the apparatus. In this embodiment of the invention, the front of the tray or support closure 13 is open to allow the container or containers plus pallet to be easily placed within the tray 13.

The top of the press 11 is the hopper closure 14 which is adapted to fit over the top of the container or containers which in normal operation have had the tops removed. The hopper closure 14 has a front 21, back 22, two sides 23 and a top 24. The top 24 has upwardly inwardly sloping sides, i.e., in the form of a cone or pyramid, and is equipped at its highest (lowest when turned upside down) point with a valve means 25 such as a gate valve, shear gate or trap door. The top 24 and valve means 25 form a hopper which may be opened to allow material which has been dumped from an inverted open container into the inverted hopper closure 14 to flow into another container or receptacle positioned below the valve means 25. The sides 23 of the hopper closure 14 are equipped with a top pulley 26 and preferably a line or cable top guide means 27 to hold the line or cable against the top pulley 26.

Optionally, the press 11 is equipped with a container securing means 28 for holding the container within the press 11. This container securing means 28 may be located on the front and/or the back of the press. The container securing means 28 may be a flexible rod or bar, line or cable 29 and a securing attachment means 30 on the front of the bottom 17 and/or back 16 and on the front 21 and/or back 22.

The hopper closure 14 has at least one hopper closure support means 31 for interacting with and supporting the hopper closure 14 on the frame 12. In FIGS. 1, 2, 4, 7 and 8, there are two support means 31 consisting of bars adapted to fit in two sets of two grooves 40a, 40b, said bars 31 running parallel with the front 21 and back 22, across the top 24 as shown in FIGS. 1, 2, 7, and 8 (31b). It is also possible to have the hopper support means 31 extend out past the sides 23 (FIGS. 4 and 7

[31a]) and be attached to any part of the hopper closure 14 as long as they do not interfere with the rotation of the hopper closure 14 (FIGS. 4 and 8) or are in fact the reeving means 32 discussed below.

Figure 2:
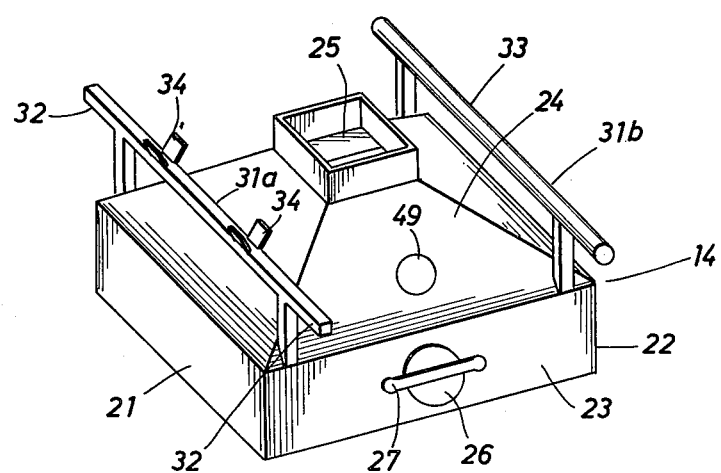
FIG. 2 is a side view of one embodiment of the hopper closure.
Figure 7:
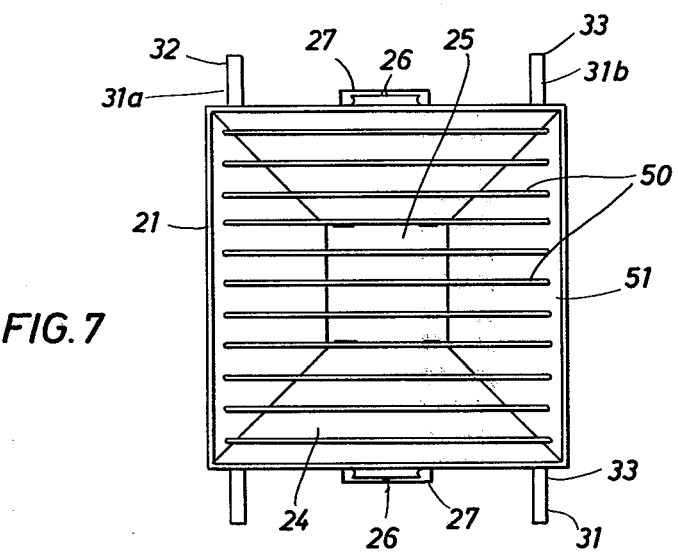
FIG. 7 is a bottom view of the hopper closure of FIG. 2 adapted for carton or crates.

The hopper closure 14 in FIGS. 1, 2 and 7, is also equipped with a or a set of two reeving means 32 which are in front of the top pulley 26 preferably between the pulley 26 and the front 21, the reeving means 32 extend perpendicular to the sides 23 so that they are essentially in a vertical plane formed by the pulleys 19 and 26. In FIGS. 1, 2 and 7, the reeving means 32 and the front hopper support means 31a are the same bar.

The hopper closure 14 is equipped with a first hopper pivot means 33 for helping to invert the press 11/container upon raising off the rack or frame 12 and for righting the inverted press 11/container upon lowering the press 11/container onto the frame 12. The first hopper pivot means 33 is located behind the pulley 26 and in FIGS. 1, 2, 4 and 7 extends above the sloping top sides 24 of the hopper closure 14. In FIGS. 1, 2, 4 and 7, the first hopper pivot means 33 and the back support means 31b are the same bar.

The hopper closure 14 is also equipped with a second hopper pivot means 34 for assisting to invert the press 11/container/pallet when raising off the rack or frame 12 and assisting to right the press 11/container/pallet upon lowering same into the rack or frame 12. The second hopper pivot means 34 may be at least one notch or groove as in FIGS. 1, 2 or a bar as in FIG. 4.

The frame or rack 12 as shown in FIGS. 1 and 3 is a rectangular prism or cube of bars or pipes where the front lateral bars are missing so that the press 11 may pass within the frame through the front. The frame 12 comprises two front bars 35 perpendicular to the ground, two back bars 36 perpendicular to the ground, a bottom back lateral bar 37 parallel to the ground connecting the bottom of the back bars 36, a top back lateral bar 28 parallel to the ground connecting the top of the back bar 36, two bottom lateral side bars 54 parallel to the ground, perpendicular to the bottom back lateral bar 37, each connecting one front bar 35 and one back bar 36 and two top lateral side bars 39 parallel to the ground and each connecting a front bar 35 to a back bar 36. The frame 12 may have additional support and reinforcing bars as long as they do not obstruct the raising and lowering of the press 11 and container.

The top lateral bars 39 are equipped with at least one frame support means 40 adapted to interact with the hopper closure support means 31 and thereby support the hopper closure 14 on the top of the frame 12. The height of the frame 12 and the position of support of the hopper closure 14 are such that the container or container plus pallet may be easily placed in between the hopper closure 14 and the support closure or tray 13.

Figure 4:
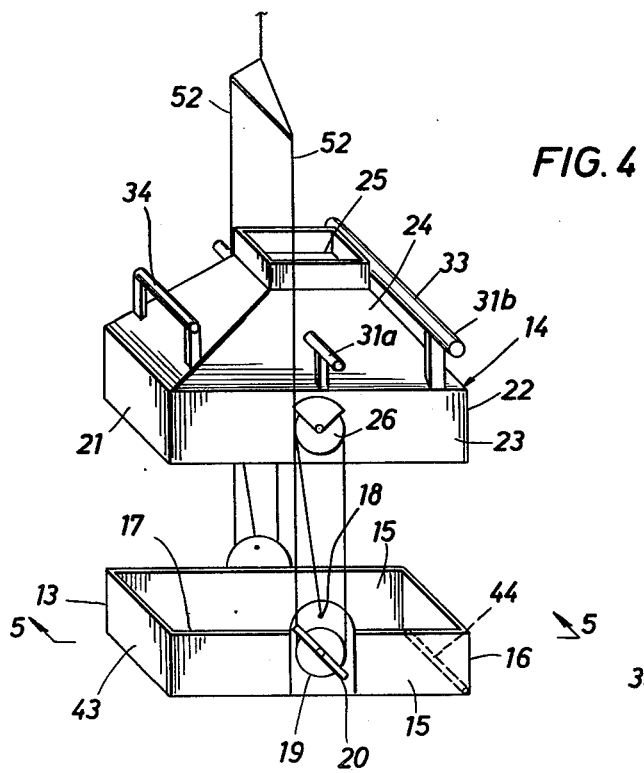
FIG. 4 is a side view of the press.

In FIGS. 1 and 4 and frame support means 40 is a set of front frame support means 40a, grooves on both sides of the frame adapted to accept the hopper support means 31a and a second set of back frame support means 40b, grooves on both sides of the frame adapted to accept the hopper support means 31b. The back frame support means 40b may also be the first frame pivot means 41 described below.

The top of the frame 12 is also equipped with a first frame pivot means 41 adapted to interact with the first hopper pivot means 33 to assist in the inverting of the press 11 upon raising and in the righting of the inverted press 11 upon lowering onto the rack. The top of the frame 12 is also equipped with a second frame or rack pivot means 42, behind the first frame pivot means 41 adapted to interact with the second hopper pivot means 34 so as to assist the inverting of the press 11 on raising and to initiate the righting of the inverted press 11 upon lowering onto the frame 12. The relative positions of the two sets of pivot means cause the two first pivot means, 33 and 41, to interact first upon lifting the press 11, followed by the interaction of the second means, 34 and 42, after partially inverting the press, completing the inverting of the press.

Upon lowering, the two second pivot means, 34 and 42, interact first, partially righting the press, then the first pivot means, 33 and 41, interact completing the righting of the press.

In FIGS. 1 and 3 the first frame pivot means 41 and one set of frame support means 40b are the same grooves or notches. FIG. 1 illustrates a preferred embodiment of the invention in that the groove, 41 (and 40) opens substantially forward, i.e., has an overhang, thereby forcing the press 11 to begin to invert when lifted, since the first hopper pivot means 33, a bar, contacts the overhang if lifted straight up. However, when the two second pivot means 34 and 42 interact, the first hopper pivot means 33 pivots forward and out of the groove 41.

Figure 5:
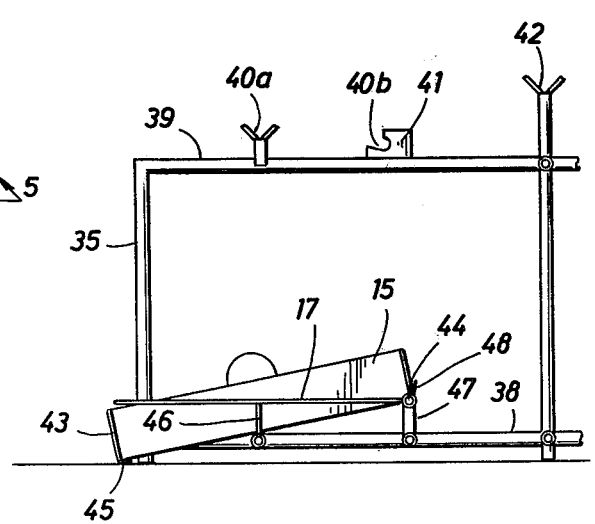
FIG. 5 is a side view of the frame of FIG. 3 cut along lines 5—5 and of the support closure of FIG. 4 in place on the frame and cut along line 5—5.

FIGS. 3, 4 and 5 illustrate another preferred embodiment of the invention. In FIGS. 3 and 5 the second frame pivot means 42 is a set of grooves where this same means 42 in FIG. 1 is a bar. The press 11 of FIGS. 3 and 5 differs from the press in FIGS. 1 and 2. The hopper closure 14 has its forward set of support means 31a set above (not in front of) the pulley 26, and there is no reeving means 32. When the press 11 is resting on the frame 12, the cable is between the second hopper pivot means 34 and the forward support means 31a. The second hopper pivot means 34 is a bar rather than a set of grooves as in FIGS. 1 and 2. The container support closure 13 has a front 43. The bottom 17 is hinged near the back 16 by hinge means 44 so that the front edge of the bottom 17 can swing from the bottom of the front 43 to the top of the front 43. The support closure 13 is equipped with a floor swing stop means 45 for preventing the hinged floor 17 from swinging down past the bottom of the front 43.

The frame 12 in FIGS. 3 and 5 is equipped with a support bottom tilt means 46 between the bottom lateral bars 54 and behind the support bottom tilt means 46 between the bars 54 is a support closure tilt means 47 for tilting the entire support closure 13. The height of the support closure tilt means 47 being such that it raises the bottom of the back 16 essentially to the same height as the top of the front 43 while the front of the floor 17 is swung by the support bottom tilt means 46 to the top of the front 43 thereby supplying a level surface without a lip in order to place the container on and within the support closure. This avoids having to lift the container/pallet over the front 43.

Figure 6:
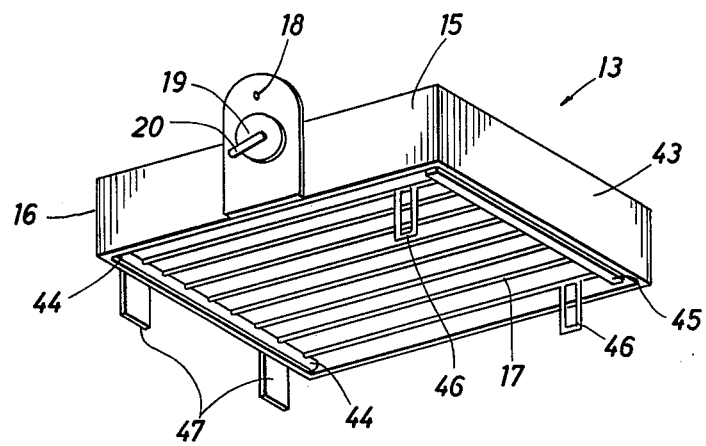
FIG. 6 is a view of the support closure.

In FIG. 6 the support closure 13 has a bottom 17 made of pipes running from front to back, the hinge means 44 are on the sides 15 near the back 16. The bottom tilt means 46 are attached to the bottom 17 instead of the frame 12. The support tilt means 47 are attached to the bottom of the back 16. The support closure 13 of FIG. 6 is adapted to be used with the frame 12 of FIG. 1, i.e., a frame 12 without the tilting means 46 or 47.

FIG. 1 also shows a support closure guide means 48 for guiding the support closure 13 on to the ground or on to the frame 12 directly below the hopper closure 14. The support closure guide means 48 can be bars which rise vertically and are fixed to the frame between the bottom lateral bars 54 so that as the press 11 is lowered and pivoted the support closure 13 strikes the guide means 48 and is guided into the proper position below the hopper closure 14.

FIG. 2 shows a preferred embodiment of the invention in that the hopper closure 14 is equipped with an electrical vibrator 49 to help empty the contents which have been dumped from the container or containers into the hopper closure 14.

Figure 8:
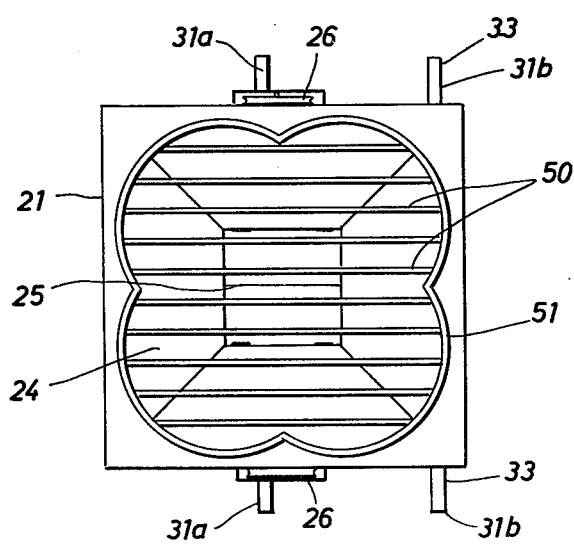
FIG. 8 is a bottom view of the hopper closure of FIG. 4 adapted for a pallet of drums or barrels.

FIGS. 7 and 8 are views from the bottom of the hopper closure 14 inside the hopper closure 14. The inside of the hopper closure 14 is equipped with container stop means 50 for holding the container or containers in the proper position and for breaking up aggregated container contents as the contents are dumped from the container into the hopper closure 14. The stop means 50 may be a series of horizontal bars running across the hopper closure at a depth inside the hopper to hold the container in the proper position.

In another embodiment of the invention, the inside of hopper closure 14 is equipped with a container sealing means 51 for insuring that contents dumped from the container do not spill out of the hopper by making their way between the sides 23, front 31 or back 22, and the container sides. This sealing means 51 is preferably made of a resilient material such as a rubber or plastic foam (such as polypropylene foam). The container fits snugly into the hopper closure 14 with the sealing means 51 pressing its sides.

FIG. 7 is a bottom view of the hopper closure 14 of FIG. 2 and illustrates a hopper closure 14 adapted to receive boxes or crates. FIG. 8 is a bottom view of the hopper closure 14 of FIG. 4 and illustrates a hopper closure adapted to receive four drums or barrels.

One embodiment of the process of the invention will be described using the apparatus of FIGS. 1, 2 and 7. A container(s) optionally with pallet is placed in the support closure 13 which rests on the ground. A convenient method of placing the container into the closure 13 is to use a forklift. The absence of a front on the support closure 13 of FIG. 1 allows the container to be easily inserted. The height of the opening between the support closure 13 and the hopper closure 14 is such that the container may be placed in the support closure 13 and directly under the hopper closure 14 which is suppoted on the frame 12 by the support means 31 and 40. Two lines, cables, ropes or chains 52 are or have been attached to the two line attachment means 18 and lead up over the top pulley 26, through the guide means 27, back down through the channel stop means 20 around the bottom pulley 19, over the reeving means 32 and are attached to a lifting means such as a crane or forklift, optionally and preferably through a sling 54. The combination line attachment means 18 and the top and bottom pulleys 19, 26 form a block and tackle arrangement.

The container may be made secure by engaging the securing means 28 by attaching a rod or cable 29 to the securing attachment means 30.

The lifting means is activated and the support closure 13 and container/pallet are lifted until the upper part of the container, whose top has been removed, moves into the hopper closure 14, optionally engaging the sealing means 51, until it engages the stop means 50 or the hopper closure top 24.

Additional lifting causes the press 11 and the container to pivot about the first hopper pivot means 33 and the first frame pivot means 41, thereby disengaging the front hopper support means 31a from the front rack support means 40a. The press 11 continues to rotate as it is lifted until the cable 52 disengages from the reeving means 32 and the second hopper pivot means 34 engages the second rack or frame pivot means 42. Further lifting completes the inversion of the press 11 and its enclosed container and totally disengages the press 11 from the frame 12, i.e., the support means 31b and 40b disengage. The relative weights of the hopper closure means 14 and the support closure 13, together with the placement of the pulley 26 insure that the press 11 and container are stable in the inverted position. This is further insured by the channel stop means 20 which prevents the press 11 from over rotating. In addition, the partial dumping of the contents of the container into the hopper closure 14 further shifts the center of gravity so that the press 11 and container stay inverted.

Next, the inverted press 11 with its container is positioned over the receptacle into which the contents are to be dumped and the valve means 25 is opened. The electrical vibrator 49 may be actuated to help completely empty the container and hopper closure 14. When the hopper closure 14 is empty, the inverted press 11 and empty container are positioned over the frame 12 so that upon lowering the second hopper pivot means 34 contacts the second frame pivot means 42 and the press 11 plus empty container are tilted forward. Continuing to lower the press 11 causes the press 11 to pivot until the first pivot means 33 contacts the first frame pivot means 41 and the pivot means 42 and 34 disengage. Still further lowering causes the press to pivot forward even further until the reeving means 32 contacts the cable and the forward hopper support means 31a engages the forward frame support means 40a and the hopper closure 14 is resting on the top of the frame 12. Additional lowering causes the block and tackle effect and the empty container and the support closure 13 are lowered onto the ground, the top of the empty container coming free of the hopper closure 14. The empty container may now be withdrawn from the support closure 13 and the dumping apparatus is ready to repeat the process.

The press essentially walks on its pivot means to an inverted position then once the container is emptied, walks back again to the uprighted position.

FIGS. 3, 4 and 5 may be viewed to follow a preferred embodiment of the process of the invention. In this embodiment of the invention, the support closure 13 has a bottom 17 which is hinged 44, the front 43 of the support closure 13 is essentially as high as the sides 15 and back 16 and may cause one to eliminate the use of a container securing means 28. The back of the support closure 13 rests on support closure tilt means 47 essentially the same height as the front 43, the hinged floor 17 is forced up by the floor tilt means 46 so that the front edge of the floor 17 is at the top of the front 43. This presents a level floor 17 with no lip or front 43 over which the container must be moved and therefore a forklift may easily set or slide a container/pallet on to the floor 17 of the hopper closure 13. In FIGS. 3 and 5, the tilt means 46 and 47 are attached to the frame 12 and the tilt means 47 may serve as support closure guide means 48. In FIG. 6, a variation of these embodiments is shown, where the support closure tilt means 47 are attached to or near the back 16 of the support closure 13, and the floor tilt means 46 are attached to the floor 17. Whether the tilt means 46 and 47 are attached to the frame 12 or the support closure they perform the same function, i.e., facilitate the placing of the container within the press.

The cable 52 is attached to the cable attachment means 18, travels up around the pulley 26, through the guide means 27 down through the channel stop means 20 and around the pulley 19. In one embodiment the cable does not go over a reeving means but is attached directly (possibly through a sling) to the lifting means. This is possible because the front hopper and frame supporting means 31 and 40 are positioned behind the cable over the pulley 26 and the second hopper pivot means 34 is not in the vertical planes of the pulleys 19, 26.

As the lifting means begins to lift, the support closure 13 is picked up and the floor 17 settles back to a position where the front of the floor is even with the bottom of the front 43, the container/pallet settles into the support closure 13. Further lifting forces the container top into the hopper closure 14 so that the container is enclosed in the press 11. At this juncture the press 11 may be quickly lifted straight up, the relative weights of the hopper closure 14 and support closure 13 and the placement of the pulleys causing the press 11 to invert. This procedure is unsafe where heavy loads are involved. Therefore, the press 11 may be walked over on its pivot means as decribed above and the contents emptied or dumped. Again, as described above, the reverse walk is taken where the inverted press 11 and empty container are lowered onto the frame 12 so that the second hopper pivot means 34 engages the second frame pivot means 42 and the inverted press 11 begins to tilt forward. In FIGS. 3 and 4 these pivot means 34 and 42 are a bar and at least one groove respectively while in FIGS. 1 and 3, pivot means 34 is at least one groove while pivot means 42 is a bar.

Continually lowering the press 11 tilts it further forward engaging the first hopper pivot means 33 with the first frame pivot means 41 and disengages pivot means 34 and 42. Still further lowering engages support means 31a with 40a, frees the container from the hopper closure 14, engages the support closure tilt means 47 and the floor tilt means 46 so that once the support closure 13 is supported on the surface on which it rests, the back of the support closure 13 is tilted up and the front of the floor 17 and the bottom of the empty container are level with the top of the front 43. The empty container may be easily removed.

Where there is no reeving means 32, it is particularly advantageous to have the first frame pivot means 41 be a groove with an overhang (FIG. 1) so that the opening is facing substantially toward the front of the frame 12 and the press 11 is forced to pivot when the first hopper pivot means 33, a bar, contacts the overhang when the press 11 is lifted. The height of the engagement of the second pivot means, 34 and 42 over the first pivot means 33 and 41 is such that when lowering the press onto the frame 12, the center of gravity of the press 11 causes the press 11 to continue to invert.

Another embodiment of the method of the invention may be illustrated by using the hopper closure 14 of FIG. 2, the support closure 13 of FIG. 6 and the frame 12 of FIG. 1. The container, with its top removed, is placed on the floor 17 of the support closure 13 where the support closure 13 is tilted by support closure tilt means 47 so that the bottom of the back 16 is essentially level with the top of the front 43 and the hinged means 44 floor or bottom 17 is swung up so that the front of the floor 17 is substantially level with the top of the front 43. Cables which have been attached to cable attachment means 18, passed over the top pulley 26, through the top guide means 27, down through the channel stop means 20, over the bottom pulley 19, up and over a reeving means 32 are attached to a lift means (preferably through a sling) such as a crane. The lift means is actuated and the support closure 13 with the container starts up. The bottom 17 settles so that the front of the bottom 17 is at a level equal to the bottom of the front 43, and the top of the container is forced into the hopper closure 14. Further lifting disengages the first support means 31a and 40a, activates the first pivot means 33 and 41 to initiate the inverting. More lifting disengages the second support means 31b and 40b, disengages the reeving means 32, engages the second pivot means 34 and 42 and completes the inverting. The inverted press 11 is positioned over the receptacle, the valve means 25 is opened and the vibrator 49 actuated to empty the contents of the container/hopper closure 14. The press 11 and empty container are positioned over the frame 12 and lowered so that the second pivot means 34 and 42 interact and the press 11 begins to right itself. Further lowering engages the first pivot means, 33 and 41, the receiving means 32 and completes the righting with the engaging of the support means, 31 and 40. Optionally, the support closure 13 engages the stop means 48. Still further lowering disengages the container from the hopper closure 14, lowers the support closure 13, engaging the support closure tilt means 47 and the bottom tilt means 46 so that, at rest, the bottom of the back 16 is essentially at a level equal to the top of the front 43 and the bottom 17 is swung so that the front of the bottom 17 is at a level equal to the top of the front 43. The empty container is removed.

FIG. 3 illustrates that the frame 12 may be constructed so that its mirror image is produced about a plane through the second frame pivot means 42 and bars 36. Then, by using two presses 11 it is possible to be loading one press 11 while dumping the other press 11.

The press 11 and frame 12 are usually made of metal but could be made of any strong rigid material such as wood or plastic. The preferred metals are steel and iron, the most preferred metal is steel.

We claim as our invention:

1. An improved container dumping apparatus comprising a container press and a press frame adapted to hold the press where (I) the container press comprises a bottom container support closure and a top container hopper closure, (a) the bottom container support closure having a back, bottom and two sides, each side of the support closure having a line or cable attachment means for attaching a line or cable, a support closure pulley below the cable attachment means and a channel stop means, forming a channel next to the support closure pulley, located at the pulley's side closest to the back of the container support closure for securing the cable on the pulley and stopping the press rotation, the hopper closure having a front, back, two sides, and a top, the top being conical or pyramidal and having at its highest point a valve means for emptying the hopper closure, each side of the hopper closure having a hopper closure pulley, and a cable or line guide means for securing the line or cable to the hopper closure pulley; (b) the hopper closure having at least one hopper support means for supporting the hopper closure on the frame above the support closure and a first hopper pivot means for initiating the inverting of the press/container upon lifting the press off the frame and completing the righting upon lowering the press onto the frame and a second hopper pivot means for completing the inverting of the press upon lifting the press off of the frame and initiating the righting upon lowering the press onto the frame; (II) the frame having at least one frame support means for interacting with the hopper closure support means and supporting the hopper closure on the frame above the container support closure, a first frame pivot means for interacting with the first hopper closure pivot means and initiating the the inverting of the press upon lifting and completing the righting of the press upon lowering and a second frame pivot means for interacting with the second hopper closure pivot means for completing the inverting of the press upon lifting and initiating the righting of the press upon lowering.

2. The improved dumping apparatus of claim 1 where the hopper closure has a reeving means on each side forward of the hopper closure pulley in the same vertical plane as the hopper closure pulley and the support closure pulley for interacting with a cable which has been attached to the line attachment means, passed upward over the hopper closure pulley downward over the support closure pulley and upward to a lifting apparatus.

3. The improved dumping apparatus of claim 1 or 2 where the press has at least one container securing means attached to front or back of said press for preventing the container from sliding out of the press during operations.

4. The improved dumping apparatus of claims 1 or 2 where the support closure has a front, the bottom of the support closure being hinged substantially across the back of the bottom allowing the bottom to swing so that the front of the bottom can be moved between the bottom of the front and the top of the front, the support closure has a support closure tilt means attached to the support closure protruding downward to a length such that when the support closure is on the surface on which it rests the support closure is tilted at an angle such that the bottom of the back is essentially at a height equal to the top of the front and the bottom of the support closure is equipped with a bottom tilt means protruding from the bottom to a length such that when the support closure is on the surface on which it rests, the front of the bottom is tilted to a height essentially equal to the top of the front of the support closure.

5. The improved dumping apparatus of claims 1 or 2 where the support closure has a front, the bottom of the support closure being hinged substantially across the back of the bottom allowing the bottom to swing so that the front of the bottom may be moved between the bottom of the front and the top of the front, the frame is equipped with a support closure tilt means attached to the bottom of the frame for engaging and tilting the support closure so that at rest the bottom of the back of the support closure at rest is at a height essentially equal to the top of the front of the support closure and a bottom tilt means attached to the bottom of the frame for interacting with the bottom of the support closure so that at rest the front of the bottom is forced to a height essentially equal to the top of the front of the support closure.

6. The improved container dumping apparatus of claims 1 or 2 where the support closure has a front, the bottom of the support closure being hinged substantially across the back of the bottom allowing the bottom to swing so that the front of the bottom may be moved between the bottom of the front and the top of the front, the frame is equipped with a support closure tilt means attached to the bottom of the frame for engaging and tilting the support closure so that at rest the bottom of the back of the support closure is at a height essentially equal to the top of the front of the support closure and the bottom of the support closure is equipped with a bottom tilt means protruding to a height such that when the support closure is at rest the bottom of the support closure is tilted so that the front of the bottom is essentially at a height equal to the top of the front.

7. The improved container dumping apparatus of claims 1 or 2 where the support closure has a front, the bottom of the support closure being hinged substantially across the back of the bottom allowing the bottom to swing so that the front of the bottom may be moved between the bottom of the front and the top of the front, the support closure having a support closure tilt means attached thereto and protruding to a height below the closure so that at rest, the bottom of the back of the support closure is at a height essentially equal to the top of the front of the support closure, the frame having a bottom tilt means attached to the bottom of the frame adapted to engage and swing the bottom of the support closure so that, at rest, the front of the bottom of the support closure is essentially at the top of the front of the support closure.

8. An improved container dumping apparatus comprising a press adapted to receive and hold at least one container with or without pallet and a frame adapted to receive and hold the press, the press comprises a support closure and a hopper closure, the support closure having a front, back, two sides and a bottom, the bottom being hinged near the back so that the front may be moved through an arc from the bottom of the front to the top of the front, each side of the support closure having a line attachment means, for attaching a line or cable, a bottom pulley beneath the line attachment means and channel stop means for holding the line on the pulley and retarding the rotation of the press during operation, a support closure tilt means for tilting the support closure so that, at rest, the bottom of the back is at a height essentially equal to the top of the front and a bottom tilt means for swinging the bottom so that, at rest, the front of the bottom is essentially at the top of the front, the hopper closure having a front, a back, two sides and a top, the top having upwardly, inwardly sloping sides, ending at its highest point with a valve means for retaining and dispensing materials dumped into the hopper closure, each side of the hopper closure having a top pulley and a top line guide means for securing a line about the top pulley, the hopper closure having a first hopper support means located behind the top pulley for interacting with the frame and supporting the hopper closure on the frame above the support closure, a second hopper support means located in front of the top pulley for interacting with the frame and supporting the hopper closure on the frame, a first hopper pivot means located behind the top pulley for initiating the inverting and completing the righting of the press, a second hopper pivot means located in front of the top pulley for completing the inverting and initiating the righting of the press, and a reeving means located in front of the top pulley for assisting the inverting of the press, the frame having a first frame support means for interacting with the first hopper support means and supporting the hopper closure, a second frame support means for interacting with the second hopper support means and supporting the hopper closure on the frame over the support closure, a first frame pivot means for interacting with the first hopper pivot means and initiating the inverting of and completing the righting of the press and a second frame pivot means for interacting with the second hopper pivot means and completing the inverting of and initiating the righting of the press.

9. An improved container dumping apparatus comprising a press adapted to receive and hold at least one container with or without pallet and a frame adapted to receive and hold the press, the press comprises a support closure and a hopper closure, the support closure having a front, back, two sides and a bottom, the bottom being hinged near the back so that the front may be moved through an arc from the bottom of the front to the top of the front, each side of the support closure having a line attachment means, for attaching a line or cable, a bottom pulley beneath the line attachment means and channel stop means for holding the line on the pulley and retarding the rotation of the press during operation, the hopper closure having a front, back, two sides and top, the top having upwardly, inwardly sloping sides, ending at its highest point with a valve means for retaining and dispensing materials dumped into the hopper closure, each side of the hopper closure having a top pulley and a top line guide means for securing a line about the top pulley, the hopper closure having a first hopper support means located behind the top pulley for interacting with the frame and supporting the hopper closure on the frame above the support closure, a second hopper support means located in front of the top pulley for interacting with the frame and supporting the hopper closure on the frame, a first hopper pivot means located behind the top pulley for initiating the inverting and completing the righting of the press, a second hopper pivot means located in front of the top pulley for completing the inverting and initiating the righting of the press, and a reeving means located in front of the top pulley for assisting the inverting of the press, the frame having a first frame support means for interacting with the first hopper support means and supporting the hopper closure, a second frame support means for interacting with the second hopper support means and supporting the hopper closure on the frame, over the support closure, a first frame pivot means for interacting with the first hopper pivot means and initiating the inverting of and completing the righting of the press, a second frame pivot means for interacting with the second hopper pivot means and completing the inverting of and initiating the righting of the press, a support closure tilt means for interacting with and tilting the support closure so that, at rest, the bottom of the back of the support closure is at a height essentially equal to the top of the front of the support closure and a bottom tilt means for interacting with and swinging the bottom of the support closure so that, at rest, the front of the bottom of the support closure is at the top of the front of the support closure.

10. The improved container dumping apparatus of claims 8 or 9 where the first and second hopper support means are bars extending past the plane of the sides of the hopper closure and the first and second frame support means are two sets of grooves on the sides at the top of the frame adapted to interact with the bars, the second hopper support means also acting as the reeving means.

11. The improved container dumping apparatus of claim 10 where the first hopper pivot means and the first hopper support means are the same bar and the first frame pivot means and the first frame support means are the same grooves.

12. The improved container dumping apparatus of claim 11 where the first frame pivot means' grooves have their openings facing substantially forward so that the upward motion of the press, at the point of interaction of the first hopper pivot means and the first frame pivot means, is retarded and the tendency to pivot is enhanced.

13. The improved container dumping apparatus of claim 11 where the hopper closure is equipped with a vibrator for helping to insure that all materials dumped into the hopper exit through the opened valve means.

14. The improved container dumping apparatus of claim 11 where the second hopper pivot means is at least one groove and the second frame pivot means is a bar adapted to interact with said groove.

15. The improved container dumping apparatus of claim 14 where the frame has a support closure guide means attached to the bottom of the frame for assisting in the positioning of the support closure upon lowering into its resting position.

16. The improved container dumping apparatus of claim 14 where the inside of the hopper closure is equipped with a plurality of bars attached to the hopper closure for assisting in the positioning of the container and breaking up materials dumped from the container.

17. The improved container dumping apparatus of claim 14 where the inside circumference of the hopper closure is equipped with a container sealing means for gripping the sides of the container and preventing container contents from spilling out.

18. The improved container dumping apparatus of claim 14 where the bottom of the support closure is a series of bars running parallel with the sides of the support closure.

19. A method of dumping at least one container with or without pallet where the apparatus for dumping the contents of the container comprises a press adapted to receive and hold at least one container with or without pallet and a frame adapted to receive and hold the press, the press comprises a support closure and a hopper closure, the support closure having a front, back, two sides and a bottom, the bottom being hinged near the back so that the front may be moved through an arc from the bottom of the front to the top of the front, each side of the support closure having a line attachment means for attaching a line or cable, a bottom pulley beneath the line attachment means and channel stop means for holding the line on the pulley and retarding the rotation of the press during operation, a support closure tilt means for tilting the support closure so that, at rest, the bottom of the back is at a height essentially equal to the top of the front and a bottom tilt means for swinging the bottom so that, at rest, the front of the bottom is essentially at the top of the front, the hopper closure having a front, back, two sides and top, the top having upwardly, inwardly sloping sides, ending at its highest point with a valve means for retaining and dispensing materials dumped into the hopper closure, each side of the hopper closure having a top pulley and a top line guide means for securing a line about the top pulley, the hopper closure having a first hopper support means located behind the top pulley for interaction with the frame and supporting the hopper closure on the frame above the support closure, a second hopper support means located in front of the top pulley for interacting with the frame and supporting the hopper closure on the frame, a first hopper pivot means located behind the top pulley for initiating the inverting and completing the righting of the press, a second hopper pivot means located in front of the top pulley for completing the inverting and initiating the righting of the press, and a reeving means located in front of the top pulley for assisting the inverting of the press, the frame having a first frame support means for interacting with the first hopper support means and supporting the hopper closure, a second frame support means for interacting with the second hopper support means and supporting the hopper closure on the frame, over the support closure, a first frame pivot means for interacting with the first hopper pivot means and initiating the inverting of and completing the righting of the press and a second frame pivot means for interacting with the second hopper pivot means and completing the inverting of and initiating the righting of the press, said method comprising (I) placing at least one container without its top, with or without a pallet on the bottom of the support closure under the hopper closure, the press having a line attached to each line attachment means, passing over the top pulley, through the top guide means, down over the bottom pulley, through the channel stop means, over the reeving means to a lifting means for lifting the press and container; (II) lifting the support closure so that the front of the bottom swings down to the bottom of the front, the container is inside the support closure, the support closure with container moves up so that the top of the container moves inside the hopper closure and the container is in the press; (III) additional lifting to cause the first hopper pivot means to interact with the first frame pivot means, the first hopper and first frame support means to disengage and the press and container begin to invert; (IV) further lifting to cause the line to disengage from the reeving means, the second hopper and second frame pivot means to interact, assisting the inversion of the press and container, the first hopper and first frame support means to disengage and the contents of the container to fill the hopper; (V) further lifting to disengage the inverted press from the frame, cause the line to engage the channel stop means, and position the press plus container over a receiving vessel; (VI) opening the valve means to allow all of the contents of the container to flow out of the container and hopper closure into the receiving vessel; (VII) returning the press with its empty container to a position over the frame and lowering so that the second hopper and second frame pivot means interact and the press and the empty container begin to right themselves; (VIII) lowering further to cause the first hopper and first frame pivot means to interact, the second hopper and second frame pivot means to disengage thereby assisting the righting of the press and container, the line to engage the reeving means and the first and second hopper support means to settle on to the first and second frame support means; (IX) lowering further to cause the container to withdraw from the hopper closure, the support closure with the container to strike the surface on which it rests, the support closure tilt means to tilt the support closure so that the bottom of the back is at a height essentially equal to the top of the front and the support bottom tilt means to swing the front of the bottom of the support closure with the empty container to a height essentially equal to the top of the front of the support closure; and (X) removing the empty container thereby readying the apparatus to repeat the method.

20. A method of dumping at least one container with or without a pallet where the apparatus for dumping the contents of the container comprises a press adapted to receive and hold at least one container with or without pallet and a frame adapted to receive and hold the press, the press comprises a support closure and a hopper closure, the support closure having a front, back two sides and a bottom, the bottom being hinged near the back so that the front may be moved through an arc from the bottom of the front to the top of the front, each side of the support closure having a line attachment means for attaching a line or cable, a bottom pulley beneath the line attachment means and channel stop means for holding the line on the pulley and retarding the rotation of the press during operation, the hopper closure having a front, back, two sides and top, the top having upwardly, inwardly sloping sides, ending at its highest point with a valve means for retaining and dispensing materials dumped into the hopper closure, each side of the hopper closure having a top pulley and a top line guide means for securing a line about the top pulley, the hopper closure having a first hopper support means located behind the top pulley for interacting with the frame and supporting the hopper closure on the frame above the support closure, a second hopper support means located in front of the top pulley for interacting with the frame and supporting the hopper closure on the frame, a first hopper pivot means located behind the top pulley for initiating the inverting and completing the righting of the press, a second hopper pivot means located in front of the top pulley for completing the inverting and initiating the righting of the press, and a reeving means located in the front of the top pulley for assisting the inverting of the press, the frame having a first frame support means for interacting with the first hopper support means and supporting the hopper closure, a second frame support means for interacting with the second hopper support means and supporting the hopper closure on the frame, over the support closure, a first frame pivot means for interacting with the first hopper pivot means and initiating the inverting of and completing the righting of the press, a second frame pivot means for interacting with the second hopper pivot means and completing the inverting of and initiating the righting of the press, a support closure tilt means for interacting with and tilting the support closure so that, at rest, the bottom of the back of the support closure is at a height essentially equal to the top of the front of the support closure and a bottom tilt means for interacting with and swinging the bottom of the support closure so that, at rest, the front of the bottom of the support closure is at the top of the front of the support closure, said method comprising (I) placing at least one container without its top, with or without a pallet, on the bottom of the support closure under the hopper closure, the press having a line attached to each line attachment means, passing over the top pulley, through the top guide means, down over the bottom pulley, through the channel stop means, over the reeving means to a lifting means for lifting the press and container; (II) lifting the support closure so that the front of the bottom swings down to the bottom of the front, the container is inside the support closure, the support closure with container moves up so that the top of the container moves inside the hopper closure and the container is in the press; (III) additional lifting to cause the first hopper pivot means to interact with the first frame pivot means, the first hopper and first frame support means disengage and the press and container begin to invert; (IV) further lifting to cause the line to disengage from the reeving means, the second hopper and second frame pivot means to interact, assisting the inversion of the press and container, the first hopper and first frame support means to disengage and the contents of the container to fill up the hopper; (V) further lifting to disengage the inverted press from the frame, the line engaging the channel stop means, and positions the press plus container over a receiving vessel; (VI) opening the valve means to allow all of the contents of the container to flow out of the container and hopper closure into the receiving vessel; (VII) returning the press with its empty container to a position over the frame and lowering so that the second hopper and second frame pivot means interact and the press and the empty container begin to right themselves; (VIII) lowering further to cause the first hopper and first frame pivot means to interact, the second hopper and second frame means to disengage, thereby assisting the righting of the press and container, the line to engage the reeving means and the first and second hopper support means to settle on to the first and second frame support means; (IX) lowering further to cause the container to withdraw from the hopper closure, the support closure with the container to strike the surface, the support closure tilt means to tilt the support closure so that the bottom of the back is at a height essentially equal to the top of the front and the support bottom tilt means to swing the front of the bottom of the support closure with the empty container to a height essentially equal to the top of the front of the support closure; and (X) removing the empty container thereby readying the apparatus to repeat the method.

* * * * *